J. H. HOGSTON.
ANTISKID ATTACHMENT FOR WHEELS.
APPLICATION FILED AUG. 2, 1918.
1,344,273.
Patented June 22, 1920.
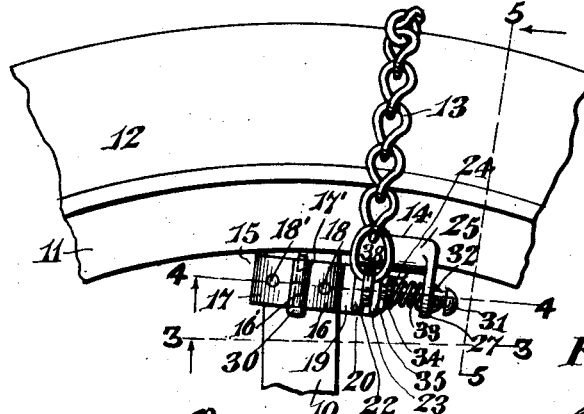
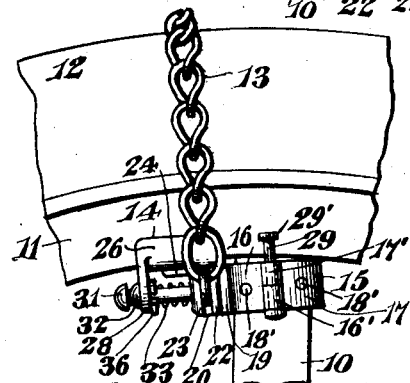
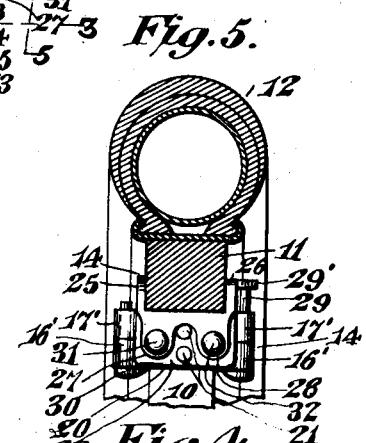
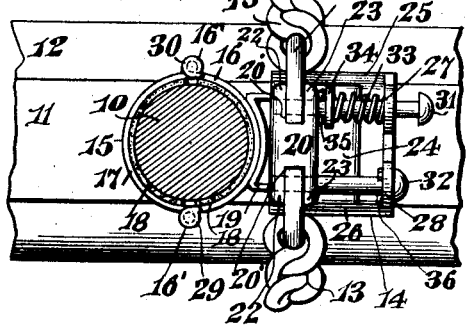
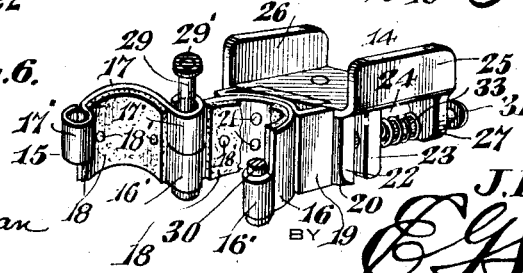
WITNESSES
Jas. E. McLathran
J. P. Smith
INVENTOR
J. H. Hogston
BY
C. Wiggers
ATTORNEY

UNITED STATES PATENT OFFICE.

JOHN H. HOGSTON, OF MINNEAPOLIS, MINNESOTA.

ANTISKID ATTACHMENT FOR WHEELS.

1,344,273.  Specification of Letters Patent.  Patented June 22, 1920.

Application filed August 2, 1918. Serial No. 247,942.

*To all whom it may concern:*

Be it known that I, JOHN H. HOGSTON, a citizen of the United States, residing at Minneapolis, in the county of Hennepin and State of Minnesota, have invented a new and useful Antiskid Attachment for Wheels, of which the following is a specification.

This invention relates to antiskid attachments for wheels.

The principal object of this invention is to provide an attachment for automobile wheels which will positively prevent skidding. Other objects are to furnish a device which is rugged and durable, and which may be easily attached and detached. A further object is to provide a device which is adaptable to many sizes and types of vehicle wheels.

A still further object is to provide a tire attachment all of whose parts are connected together so that the attachment is removed and applied as a unit, thereby making it impossible for any of the parts to be either lost or mislaid.

The invention comprises four principal parts, namely, a spoke clamp, a body member attached to the spoke clamp, a chain having one end attached to the body member, and a latch mounted on the body member and engaging the other end of the chain, thereby locking the device in position.

In the accompanying drawing—

Figure 1 is a side elevation of a portion of an automobile wheel equipped with my invention;

Fig. 2 is a similar elevation looking at the other side of the wheel;

Fig. 3 is a sectional view on an enlarged scale of the same, the section being taken on the line 3—3 of Fig. 1;

Fig. 4 is a sectional view similar to Fig. 3, but taken on the line 4—4 of Fig. 1;

Fig. 5 is a transverse section on the line 5—5 of Fig. 2 looking in the direction of the arrow;

Fig. 6 is a perspective view of the device detached.

The numeral 10 in the drawings indicates a spoke of a wheel, 11 the felly, and 12 the tire. Surrounding the tire is chain 13, which forms part of the antiskid attachment which is my invention. This chain may have any form, but is preferably so made that its links afford maximum traction with a minimum tendency to cut the tread of the tire. The length of the chain should be sufficient to embrace large as well as small tires. The chain should fit the tire loosely.

One end 38 of the chain 13 is permanently attached to a felly plate 14, while the other end is free being connected to the felly plate by a latching means which is mounted thereon. The felly plate 14, as its name indicates, is adapted to fit the inner face of the felly 11, and is so shaped that it will not shift its position transversely with respect to the felly.

Permanently secured to the felly plate is a spoke clamp designated generally by 15. Neither the spoke clamp nor the felly plate is designed to tightly fit its respective wheel parts, both being provided to hold the chain 13 in position on the tire. It should be here understood that while the drawings show one spoke equipped with the present invention, it is not at all necessary that all the spokes of each wheel be so equipped. Indeed, if every other spoke, or every third spoke has its attachment in place, the wheels will be insured against slipping and will propel the vehicle satisfactorily over icy streets. It should also be understood that while the element 15 is called the spoke clamp, it does not really clamp the spoke but only embraces the same. The function of element 15 is to prevent displacement of chain 13 on the tire.

Spoke clamp 15 consists of sections 16 and 17 which are permanently hinged together. Both sections are alike in size and form, and have their ends provided with two pairs of eyes 16' and 17' extending half way across their width. These are held in alinement when the clamp embraces the spoke, thus bringing the two sections 16 and 17 together to make up the complete clamp 15.

A pin 29 has one end rigidly secured within one of the eyes 16' of section 16 by a rivet and has its other end 29' enlarged. This pin forms a pintle for the section 17, and at the same time allows the eye 17' of said section to move or slide longitudinally on it. It will be seen that this construction allows the sections not only to swing apart or together but also permits the section 17 to be raised with respect to the other or stationary section 16. It is now clear that eyes 16′ and 17′ in conjunction with pin 29, form a sliding hinge joint. The construction is very clearly shown in Fig. 6.

The opposite eye 16′ is also provided with a pin 30, secured by a rivet and extending therefrom, said pin 30 being shorter than pin 29. The opposite eye 17′ is adapted to fit over the open end of pin 30 when section 17 is slid upon pin 29. The length of pin 29 must be sufficient to allow for this sliding motion of section 17. From what has been said, it is obvious that the clamp 15 may be detached from spoke 10 by sliding section 17 up on pins 29 and 30 until the eye 17′ has cleared the upper end of pin 30, and then swinging it outwardly upon pin 29 as a pivot. The enlarged head 29′ prevents the clamp from coming apart. This form of spoke-securing means has one great advantage: there are no nuts or other parts which can be mislaid or lost, thus rendering the whole attachment temporarily useless. It will be understood that when the attachment is in place with the chain connected to the rim plate, the sliding section of the clamp is kept from moving away from the other section by the contact of the sliding section with the rim of the wheel. In other words, as long as the chain is connected to the body member and holds the spoke clamp from dropping down on the spoke the sections of said clamp may not be opened.

Each section 16, 17, is faced on its inside with leather strips 18. Instead of leather, other material, as rubber, may be used. These strips are secured permanently to their respective sections by any suitable means—such as rivets 18′—and prevent the attachment from wearing paint off the spokes or otherwise disfiguring them. The felly plate 14 has a latch plate 20 secured to it. Preferably the latch plate 20 is riveted or welded to the inner side of the felly plate and the two constitute what may be termed as a body member. In order to secure the spoke clamp, the felly plate and the latch plate together, rivets 21 are run from the spoke clamp section 16 through the latch plate 20. An adapter 19 in the form of a saddle plate is interposed between the latch face and the spoke clamp, and is likewise held by rivets 21. This adapter permits the round spoke clamp to be brought close to the latch plate 20 and to be held firmly thereto. By this construction the spoke clamp, the latch plate and the felly plate are combined to form a unitary structure.

The felly plate 14 is made from a rectangular piece of metal bent outwardly at two ends to form flanges 25, 26. These flanges allow the felly plate to be seated on and embrace the sides of the felly, and in cooperation with other parts of the device prevent the attachment from shifting transversely with respect to the wheel. One side of the felly plate may have a cutaway portion 14ª in which a part of the latch plate 20 may be held so as to strengthen the union between the two parts. The other side of the felly plate, the side remote from the spoke clamp, is provided with ears 27, 28, bent inwardly therefrom in a direction opposite to that at which the flanges 25, 26, extend. Each ear has a bore for the reception of chain-latching bolts 31, 32, described in detail below.

The latch plate 20 referred to above, consists of a double socketed plate designed to receive, and with the aid of bolts 31 and 32 to hold, both ends of chain 13 when the latter surrounds the tire. This double socketed plate is in one piece and is made from a rectangular metal blank having two like rectangular notches or openings 20′ cut into the sides thereof at a point about one-third of the way from one end. The short part 22 is bent at right angles to form a leg and the long part 23 is likewise bent. However, part 23 is bent again to form an L-shaped leg whose foot 24 extends entirely across the felly plate transversely and is riveted, soldered or welded thereto. The legs 22 and 23 are perpendicular to the underside of the felly plate. Leg 22 may simply rest against the felly plate, or may fit into a cutaway portion 14ª formed therein.

The foregoing description should not be taken as limiting my invention to the use of a separate felly plate and latch body.

To admit the ends of locking bolts 31 and 32, holes are drilled in legs 22 and 23 in line with the bores provided in ears 27, 28. Bolts 31 and 32 are thus slidable in the respective ears and the legs. It is desirable that only one end of chain 13 be fastened each time the device is attached. Hence, an end link 39 is locked in the recess formed between legs 22 and 23 and bolt 32 is pushed in place. To hold the bolt a cotter pin 36 passing through a hole in the bolt may be provided to bear on the side of ear 28 opposite from that against which the bolt head bears. By such an arrangement, the bolt 32 is held firmly in place, yet can be slid back to disengage the chain end whenever necessary. Of course, other means than a cotter pin may be used to bring about the same result.

Bolt 31 is longer than bolt 32 to provide finger room at its outer or head end. A cotter pin 35 or the equivalent, passing through the body of the bolt prevents the bolt from being pushed so far in that the fingers cannot grasp it. A coiled spring 33 is mounted on the bolt and bears at one end against ear 27 and at its other end against a washer 34, or the like, loosely mounted on the bolt. From this description, it is plain that bolt 31 is normally held so as to extend between legs 22 and 23 but may be withdrawn by pulling on its head to admit an end link 38 of the chain.

All that is necessary in attaching the device is to embrace the spoke with the clamp, place the felly plate on the felly, pull the chain around the tire, withdraw the spring bolt and snap the end link in place. In demounting it is only necessary to pull the spring bolt out, when the chain end is released, and then lift up the clamp section as previously described, when the attachment is free of the wheel. There are no nuts, bolts, screws or similar parts which must be removed each time the device is taken off. The attachment is removable as a unit, and no parts can be lost or mislaid or can work loose. Every part is strong and durable and designed to stand rough usage.

Having described my invention, what I claim is—

1. An antiskid attachment for wheels, comprising a body member, means for connecting said member to a spoke of the wheel, a pair of bolts carried by the body member, one of said bolts being spring-actuated and the other being rigidly mounted, and a chain permanently connected to the rigid bolt and detachably connected to the spring-actuated bolt, said chain passing transversely around the wheel.

2. An antiskid attachment for wheels, comprising a body member having opposite openings, means for securing said member to a spoke of the wheel, a pair of bolts carried by the body member and traversing said openings, one of said bolts being rigidly mounted and the other spring-actuated, and a chain having links at each end engaging in said openings and locked therein by said bolts.

3. An antiskid attachment for vehicle wheels having tires comprising a body member adapted to bear against the inner face of the felly of the wheel and provided with flanges at each end to fit against the sides of said felly, a spoke clamp rigidly connected to said member in offset relation thereto, a chain adapted to be passed transversely around the tire with one end detachably and the other end permanently connected to said member outside and bearing against said flanges.

4. An antiskid attachment for vehicles, comprising a body member adapted to bear against the inner face of the felly of the wheel, and provided at the ends with flanges which extend outwardly and embrace the sides of said felly, a chain adapted to be passed transversely around the tire, spaced means at opposite ends of said member provided on the face thereof remote from the flanges to permanently connect one end and detachably connect the other end of the chain to said member, said ends of the chain extending outside and bearing against said flanges.

5. An antiskid attachment for wheels, comprising a spoke clamp formed of two hinged sections slidably mounted on the spoke, a body member, means for permanently securing said body member to one of said sections, the second section being movable toward and from the first section, a chain adapted to extend transversely across the tread of the wheel and hold the body member and spoke clamp in contact with the inner face of the felly of the wheel, thereby retaining said sections in closed relation about the spoke, means for permanently securing one end of the chain to the body member at one side thereof, and means carried by the body member for detachably securing the other end of the chain to said member, whereby the attachment is removed and applied as a unit.

6. An antiskid attachment for wheels, comprising a body member, an antiskid device carried by said member, and a spoke clamp secured to said member, said clamp being formed of two hinged sections which are maintained in locked relation by the contact of said clamp with the felly of the wheel.

7. An antiskid attachment for wheels, comprising a body member bearing against the felly of the wheel, a chain extending transversely across the tread of the wheel and connected at its ends to the body member and aiding in retaining said member in place, and a spoke clamp secured to said member, said clamp being formed of two sections connected by a slidable hinge, said hinge being maintained in locked relation by the contact of said sections with the felly of the wheel.

8. An antiskid attachment for wheels, comprising a body member bearing against the felly of the wheel, a chain extending transversely across the tread of the wheel and connected at its ends to the body member and aiding in retaining said member in place, and a spoke clamp secured to said member, said clamp being formed of two hinged sections, each section being formed with eyes at its ends, and a long and a short pin engaging the eyes, the long pin allowing one of said sections to be raised away from the other section.

9. An antiskid attachment for wheels, comprising a body member bearing against the felly of the wheel, a chain extending transversely across the tread of the wheel and connected at its ends to the body member and aiding in retaining said member in place, and a spoke clamp secured to said member, said clamp being formed of two hinged sections, one section being stationary with the body member, and the other section being adapted to be raised, when the chain is released from the body member, so as to allow the sections to swing apart.

10. An antiskid attachment for wheels, comprising a body member bearing against the felly of the wheel, a chain extending transversely across the tread of the wheel and connected at its ends to the body member and aiding in retaining said member in place, and a spoke clamp secured to said member, said clamp being formed of two hinged sections, one section being stationary with the body member, and a pair of pins connecting the movable section to the stationary section, one pin being shorter than the other, the movable section being movable along the long pin so as to become disconnected from the short pin, thereby permitting the movable section to swing on the long pin away from the stationary section.

11. An antiskid attachment for wheels comprising a body member adapted to bear against the rim of the wheel, a chain extending transversely across the tread of the wheel and connected at its ends to the body member and aiding in retaining said member in place, one end of said chain being detachable from said member, and a spoke clamp formed of two hinged sections slidably mounted on the spoke, one of said sections being rigid with said member and the other section slidable and swingable with reference to the rigid section, and said sections being retained in locked relation by said chain.

12. An anti-skid attachment for wheels, comprising a body member adapted to bear against the rim of the wheel, a spoke clamp carried by said member and slidably mounted upon a spoke of the wheel, said clamp being retained in locked relation to the spoke by the contact of the clamp with the felly of the wheel, and a chain extending transversely across the tread of the wheel and connected at its ends to the body member and serving to retain the said member and said clamp in engagement with the felly of the wheel, said chain being separable from the body member, whereby upon disconnecting the chain, the spoke clamp drops down on the spoke, causing the clamp to open and permitting the entire device to be removed as a unit from the wheel.

In testimony that I claim the foregoing as my own, I have hereto affixed my signature in the presence of two witnesses.

JOHN H. HOGSTON.

Witnesses:
G. H. SNYDER,
B. E. NYROP.